United States Patent Office 2,997,476
Patented Aug. 22, 1961

2,997,476
1-ALKYL-4-AMINOQUINALDINIUM SALTS
Dennis Caldwell and Leonard Richard Rowe, London, England, assignors to Allen & Hanburys Limited, London, England, a British company
No Drawing. Filed June 2, 1959, Ser. No. 817,497
Claims priority, application Great Britain June 19, 1958
7 Claims. (Cl. 260—286)

The invention relates to 1-alkyl-4-aminoquinaldinium salts.

The novel compounds of the present invention are 1-alkyl-4-aminoquinaldinium salts of the general formula:

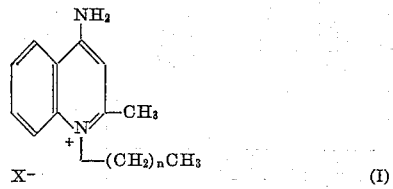

where $n$ is an integer of from 6 to 17 inclusive and X is an anion such as a halide or an acetate.

The compounds of the present invention are useful anti-microbial agents.

The preferred compounds are those in which $n$ is 9, 11, 13 and 15 and the most preferred compound is 1-dodecyl-4-aminoquinaldinium acetate.

The present invention also includes a process for the manufacture of the novel compounds of the present invention wherein one molecular proportion of 4-aminoquinaldine and more than one molecular proportion of an alkyl halide containing from 7 to 18 carbon atoms inclusive are heated together alone or in the presence of an organic solvent for at least 25 hours, for example, for 25 to 100 hours.

The product may be isolated by cooling the reaction mixture and filtering off the solid; it may then be purified by recrystallisation.

Examples of organic solvents which may be used are methyl ethyl ketone, methyl isobutyl ketone and methyl isobutyl carbinol.

Preferably the heating is conducted under reflux.

The resulting quaternary halides may be converted by conventional methods, e.g. double decomposition, into other quaternary salts such as the acetate, chloride, bicarbonate, lactate, succinate, maleate and tartrate.

The following examples illustrate the invention:

EXAMPLE 1

*Preparation of 1-heptyl-4-aminoquinaldinium iodide*

32 g. of 4-aminoquinaldine, 55 g. of heptyl iodide and 400 ml. of methyl ethyl ketone were refluxed together for 70 hours. The mixture was allowed to cool, the solid was filtered off, washed with methyl ethyl ketone and recrystallised from ethyl alcohol. The product was a white powder, melting point 225° C.

EXAMPLE 2

*Preparation of 1-decyl-4-aminoquinaldinium iodide*

32 g. of 4-aminoquinaldine, 61 g. of decyl iodide and 400 ml. of methyl isobutyl ketone were refluxed together for 50 hours. The mixture was allowed to cool, the solid filtered, washed with methyl isobutyl ketone and recrystallised from isopropyl alcohol. The product was a pink solid, melting point 197° C.

*Preparation of 1-decyl-4-aminoquinaldinium chloride*

6.5 g. of 1-decyl-4-aminoquinaldinium iodide, 2.4 g. of silver chloride and 100 ml. of isopropyl alcohol were refluxed together for 4 hours. The reaction mixture was filtered and the filtrate evaporated down to 5 ml. 50 ml. of acetone was added and the resulting precipitate was filtered off. It was a white solid, melting point 220–221° C.

EXAMPLE 3

*Preparation of 1-dodecyl-4-aminoquinaldinium iodide*

19 g. of 4-aminoquinaldine, 50 g. of dodecyl iodide and 300 ml. of methyl ethyl ketone were refluxed together for 80 hours. The mixture was allowed to cool, the solid filtered off, washed with methyl ethyl ketone and recrystallised from a mixture of isopropyl alcohol and water. The product was a white powder, melting point 177–178° C.

EXAMPLE 4

*Preparation of 1-tetradecyl-4-aminoquinaldinium iodide*

1 g. of 4-aminoquinaldine and 10 g. of tetradecyl iodide were heated together at 175° C. for 25 hours. The reaction mixture was cooled, 50 ml. of isopropyl acetate added and refluxed for 30 minutes. The reaction mixture was filtered hot and the solid so obtained was recrystallised from acetone. The product was a pink solid, melting point 176–177° C.

*Preparation of 1-tetradecyl-4-aminoquinaldinium acetate*

5.0 g. of 1-tetradecyl-4-aminoquinaldinium iodide was dissolved in 20 ml. of methanol and 1.75 g. of silver acetate added. The mixture was stirred in the dark at room temperature for 14 hours, filtered, and the methanol evaporated. The residue was recrystallised from acetone. The product was a white solid, melting point 152–153° C.

EXAMPLE 5

*Preparation of 1-hexadecyl-4-aminoquinaldinium iodide*

17 g. of 4-aminoquinaldine, 50 g. of hexadecyl iodide and 250 ml. of methyl ethyl ketone were refluxed together for 80 hours. The mixture was allowed to cool, the solid filtered, washed with methyl ethyl ketone and recrystallised from a mixture of isopropyl alcohol and water. The product was a pink solid, melting point 157–158° C.

EXAMPLE 6

*Preparation of 1-octadecyl-4-aminoquinaldinium iodide*

17.1 g. of 4-aminoquinaldine, 50 g. of octadecyl iodide and 300 ml. of methyl ethyl ketone were refluxed together for 100 hours. The mixture was allowed to cool, the solid filtered, washed with methyl ethyl ketone and recrystallised from a mixture of acetone and isopropyl alcohol. The product was a pink solid, melting point 165° C.

EXAMPLE 7

*Preparation of 1-undecyl-4-aminoquinaldinium iodide*

22.5 g. of 4-aminoquinaldine, 50 g. of undecyl iodide and 300 ml. of methyl ethyl ketone were refluxed together for 90 hours. The mixture was allowed to cool, the solid was filtered off, washed with methyl ethyl ketone and recrystallised from a mixture of isopropyl alcohol and water. The product was a pink powder, melting point 192° C.

EXAMPLE 8

*Preparation of 1-dodecyl-4-aminoquinaldinium lactate*

9.1 g. of 1-dodecyl-4-aminoquinaldinium iodide was dissolved in 50 ml. of methanol and 3.9 g. of silver lactate added. The mixture was stirred in the dark at room temperature for 14 hours, filtered and the methanol evaporated. The residue was recrystallised from isopropyl acetate. The product was a white solid, melting point 151–152° C.

EXAMPLE 9

*Preparation of 1-dodecyl-4-aminoquinaldinium acetate*

18.16 g. of 1-dodecyl-4-aminoquinaldinium iodide was dissolved in 70 ml. of methanol and 6.68 g. of silver acetate added. The mixture was stirred in the dark at room temperature for 4 hours, filtered and the methanol evaporated. The residue was recrystallised from acetone. The product was a white solid, melting point 170–171° C.

EXAMPLE 10

*Preparation of 1-dodecyl-4-aminoquinaldinium succinate*

4.5 g. of 1-dodecyl-4-aminoquinaldinium iodide was dissolved in 20 ml. of methanol and 2.25 g. of silver succinate added. The mixture was stirred in the dark at room temperature for 16 hours, filtered and the methanol evaporated. The residue was recrystallised from ethyl alcohol. The product was a white solid, melting point 238–240° C.

EXAMPLE 11

*Preparation of 1-dodecyl-4-aminoquinaldinium bicarbonate*

10 g. of 1-dodecyl-4-aminoquinaldinium acetate was dissolved in 100 ml. of distilled water and the solution was heated to 80° C. A solution of 3.9 g. of potassium bicarbonate in 39 ml. of distilled water was added, the precipitate was filtered off and recrystallised from distilled water. The product was a pink solid of melting point 135–136° C.

EXAMPLE 12

*Preparation of 1-dodecyl-4-aminoquinaldinium maleate*

1 g. of 1-dodecyl-4-aminoquinaldinium bicarbonate was dissolved in 20 ml. of methanol, heated to 60° C. and 0.3 g. of maleic acid added. The solvent was removed in vacuo. The residual oil crystallised on trituration with isopropyl acetate to give a white solid of melting point 97–98° C.

EXAMPLE 13

*Preparation of 1-dodecyl-4-aminoquinaldinium tartrate*

1.9 g. of 1-dodecyl-4-aminoquinaldinium bicarbonate was dissolved in 30 ml. of methanol and 0.75 g. of tartaric acid added. The methanol was evaporated and the residual oil was recrystallised from methyl ethyl ketone to give a white crystalline solid of melting point 168–169° C.

Results of investigations into the bacteriostatic activity of the compounds of the present invention are given in Table I in which the results are expressed as the minimal inhibitory concentration (M.I.C.) in μg. of the base per ml.

TABLE I.—BACTERIOSTATIC ACTIVITIES IN PEPTONE WATER WITH 0.5% DEXTROSE AND 0.5% SODIUM CHLORIDE OF SOME 1-ALKYL-4-AMINOQUINALDINIUM ACETATES

[Readings taken after 5 days' incubation at 37° C.]

| Micro-organism | Bacteriostatic activity (M.I.C.) μg./ml. Compound in which $n$ in the general Formula I is— | | | | |
|---|---|---|---|---|---|
| | 6 | 9 | 11 | 13 | 15 |
| S. aureus CN.491 | 1.9 | 0.31 | 0.14 | 0.16 | 0.88 |
| E. coli | | 12.50 | 8.80 | | |
| Proteus sp | >100 | >100 | >100 | >100 | >100 |
| S. saprophyticus | | 0.34 | 0.17 | | |
| Sarcina lutea | | 0.16 | 0.13 | | |
| Str. agalactiae | | 0.78 | 0.39 | | |
| Str. viridans | 25 | 1.40 | 0.35 | 0.39 | 1.78 |
| L. acidophilus | | | 2.21 | | |
| Ps. pyocyanea | >100 | 50 | 50 | >100 | >100 |
| M. phlei | 2.2 | 0.35 | 1.4 | 8.8 | 17.7 |

The bactericidal activity of some compounds of the present invention has also been investigated and the results are illustrated by Tables II and III.

TABLE II.—BACTERICIDAL ACTIVITY OF SOME 1-ALKYL-4-AMINOQUINALDINIUM ACETATES

| Organism | Concentration of compound as μg. of base per ml. | Control | Bactericidal activity expressed as log. No. of viable organisms per ml. after exposure to the action of the compound for 2.5 mins. | |
|---|---|---|---|---|
| | | | 9 | 11 |
| S. aureus | 50 | 13.91 | 9.41 | 6.86 |
| D. coli | 100 | 12.75 | 4.96 | 3.88 |

TABLE III

| Micro-organism | Control (no drug) | Bactericidal activity (log. No. of viable organisms/ml. after exposure to drug (100 μg./ml.) for 2.5 mins.) Compound in which $n$ in general Formula I is— | | | | |
|---|---|---|---|---|---|---|
| | | 6 | 9 | 11 | 13 | 15 |
| S. aureus CN.491 | 10.60 | 8.70 | 3.68 | 3.65 | 4.50 | 4.10 |
| E. coli | 12.70 | 9.26 | 3.10 | 5.70 | 5.37 | 5.30 |
| Proteus sp | 13.90 | | 3.90 | 5.40 | | |
| Ps. pyocyanea | 13.90 | | 5.30 | 4.10 | | |
| S. saprophyticus | 12.00 | | 4.20 | 2.70 | | |
| Sarcina lutea | 11.60 | | 4.10 | 4.30 | | |
| S. viridans | 13.30 | 9.10 | 8.60 | 6.30 | 5.86 | 6.57 |

TABLE IV.—ACTIVITY IN VITRO OF SOME 1-ALKYL-4-AMINOQUINALDINIUM ACETATES AGAINST VARIOUS MICROBIAL SPECIES

| Sample | Fungistatic activity expressed as minimal inhibitory concentration in μg. per ml. | | | | |
|---|---|---|---|---|---|
| | C. albicans | T. interdigitale | Actinomyces bovis | Dermatophilus dermatonomus | M. canis |
| 1-Heptyl-4-amino-quinaldinium acetate | 40.00 | 20.00 | | | |
| 1-Decyl-4-amino-quinaldinium acetate | 1.25 | 5.0 | | | |
| 1-Dodecyl-4-amino-quinaldinium acetate | 1.25 | 5.0 | >50 | 0.55 | 6.25 |
| 1-Tetradecyl-4-amino-quinaldinium acetate | 2.50 | 10.00 | | | |
| 1-Hexadecyl-4-amino-quinaldinium acetate | 10.00 | 28.20 | | | |
| Griseofulvin | | | >100 | >100 | 0.78 |

The effect of the compounds of the present invention upon normal skin micro-organisms in human volunteers is illustrated in Table V. In these experiments areas of the skin on the forearms of the volunteers were swabbed and the swabs incubated in nutrient glucose broth, into which an agent for inactivating the compounds remaining on the swab had been incorporated.

Selected skin areas were then treated with the test solutions and allowed to dry. The areas were again swabbed and the swabs incubated at 37° C. for 48 hours.

TABLE V

Effect of some 1-alkyl-4-aminoquinaldinium salts on normal skin micro-organisms of humans

| Solution used | No. of positive swab cultures after incubation at 37° C. for 48 hours |
|---|---|
| Controls | 6/6 |
| 70% alcohol | 6/6 |
| 1% 1-dodecyl-4-aminoquinaldinium acetate in 70% alcohol | 4/6 |
| 1% cetyl trimethyl ammonium bromide in 70% alcohol | 6/6 |
| Controls | 7/7 |
| 5% aqueous solution of 1-dodecyl-4-aminoquinaldinium acetate | 2/7 |
| 5% ditto in 70% alcohol | 1/7 |
| 1% 1-dodecyl-4-aminoquinaldinium iodide in 70% alcohol | 1/7 |

The effect of the compounds of the present invention against pathogenic organisms present on human skin has been investigated. In the experiments the results of which are recorded in Tables VI and VII, two areas were defined on the forearms of human volunteers. Both areas were swabbed with a suspension of either *Proteus sp.* of *Ps. pyocyanea* and allowed to dry, one area was then treated with a test solution which was allowed to dry, and the second area was left untreated. Each area was then swabbed with a swab soaked in broth and the swabs were incubated in nutrient broth for 4 hours at 37° C.

TABLE VI

|  | Number of positive swab cultures after incubation at 37° C. for 48 hours. ||
|---|---|---|
|  | Proteus sp. | Ps. pyocyanea |
| Control | 3/3 | 3/3 |
| 1% aqueous solution of 1-dodecyl-4-aminoquinaldinium acetate | 0/3 | 1/3 |

TABLE VI

|  | Number of positive swab cultures after incubation at 37° C. for 48 hours. ||
|---|---|---|
|  | Proteus sp. | Ps. pyocyanea |
| Control | 3/3 | 3/3 |
| 1% aqueous solution of 1-dodecyl-4-aminoquinaldinium acetate | 0/3 | 0/3 |

What we claim is:

1. 1-alkyl-4-aminoquinaldinium salts of the formula:

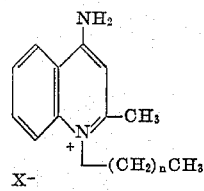

where $n$ is an integer of from 6 to 17 inclusive and X is a non-toxic anion.

2. 1-alkyl-4-aminoquinaldinium salts of the formula:

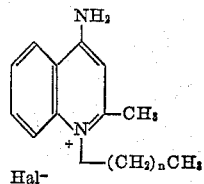

where $n$ is an integer of from 6 to 17 inclusive and Hal is a halogen.

3. 1-dodecyl-4-aminoquinaldinium iodide.
4. 1-dodecyl-4-aminoquinaldinium acetate.
5. 1-tetradecyl-4-aminoquinaldinium iodide.
6. 1-decyl-4-aminoquinaldinium iodide.
7. 1-hexadecyl-4-aminoquinaldinium iodide.

References Cited in the file of this patent

UNITED STATES PATENTS 2,791,582     Austin et al.             May 7, 1957

OTHER REFERENCES

Ochiai: Chem. Abstracts, p. 6637, vol. 45 (1951).